(12) United States Patent
Kim et al.

(10) Patent No.: US 9,984,660 B2
(45) Date of Patent: May 29, 2018

(54) DISPLAY APPARATUS

(71) Applicant: SAMSUNG ELECTRONICS CO., LTD., Suwon-si (KR)

(72) Inventors: Seung Min Kim, Yongin-si (KR); Hyung Ki Kim, Seoul (KR); Jeong Shan Na, Hwaseong-si (KR); Tae Jun Ko, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 319 days.

(21) Appl. No.: 14/513,340

(22) Filed: Oct. 14, 2014

(65) Prior Publication Data
US 2015/0170608 A1    Jun. 18, 2015

(30) Foreign Application Priority Data
Dec. 18, 2013    (KR) .................. 10-2013-0158483

(51) Int. Cl.
*G09G 5/10* (2006.01)
*G09G 5/14* (2006.01)
(Continued)

(52) U.S. Cl.
CPC ............... *G09G 5/14* (2013.01); *A47F 3/005* (2013.01); *A47F 3/0434* (2013.01); *G02F 1/01* (2013.01);
(Continued)

(58) Field of Classification Search
CPC ......... G06F 2203/04112; G06F 3/0412; G06F 2203/04107; G06F 2203/04103;
(Continued)

(56) References Cited

U.S. PATENT DOCUMENTS

2006/0154092 A1* 7/2006 Naito ...................... B32B 15/04
428/457
2007/0069974 A1* 3/2007 Kawata ............. G02F 1/133606
345/1.1
(Continued)

FOREIGN PATENT DOCUMENTS

| JP | 2004-52488 A | 2/2004 |
| WO | 2005024501 A1 | 3/2005 |
| WO | 2014008903 A1 | 1/2014 |

OTHER PUBLICATIONS

Communication dated Mar. 17, 2015 issued by the European Patent Office in counterpart European Patent Application No. 14184433.2.
(Continued)

*Primary Examiner* — Xilin Guo
(74) *Attorney, Agent, or Firm* — Sughrue Mion, PLLC

(57) ABSTRACT

Provided is a display apparatus having a transparent mode for outputting an internal object and a related image when the internal object is seen through a transparent display and an opaque mode for outputting an image having the same level as in an existing LCD display when an accurate image needs to be output on the display. A display apparatus according to an embodiment may include a main body, and a display unit coupled to the main body and configured to implement at least one of a transparent mode and an opaque mode, wherein the display unit includes a transparent display panel exposed at a front surface of the main body, a first light source disposed behind the transparent display panel, a transparency adjusting unit disposed behind the first light source, and a second light source disposed behind the transparency adjusting unit.

16 Claims, 13 Drawing Sheets

(51) Int. Cl.
- *G02F 1/01* (2006.01)
- *A47F 3/04* (2006.01)
- *G02F 1/1335* (2006.01)
- *G09F 9/30* (2006.01)
- *G09F 23/00* (2006.01)
- *A47F 3/00* (2006.01)
- *F25D 23/02* (2006.01)

(52) U.S. Cl.
CPC ......... *G02F 1/133606* (2013.01); *G09F 9/30* (2013.01); *G09F 23/0058* (2013.01); *F25D 23/02* (2013.01); *G09G 2320/06* (2013.01)

(58) Field of Classification Search
CPC .. G06F 2203/04111; G09G 2300/0426; G09G 3/3655; H01L 33/42; H01L 2924/12041; H01L 31/022466; G02F 1/137; G02F 1/163; G02F 1/155; G02F 1/167; G02F 2001/13756; G02F 1/0102; G02F 1/0121; G02F 1/13306; G02F 1/1333
See application file for complete search history.

(56) References Cited

U.S. PATENT DOCUMENTS

| | | | |
|---|---|---|---|
| 2010/0020386 A1* | 1/2010 | Ikeda | G02F 1/1506 359/297 |
| 2012/0206321 A1 | 8/2012 | Lee et al. | |
| 2014/0184577 A1* | 7/2014 | Kim | G09G 5/10 345/207 |
| 2015/0035936 A1* | 2/2015 | Robinson | H04N 7/144 348/14.08 |

OTHER PUBLICATIONS

Communication dated Jan. 8, 2018, issued by the European Patent Office in counterpart European Patent Application No. 14184433.2.

* cited by examiner

DISPLAY APPARATUS

CROSS-REFERENCE TO RELATED APPLICATION(S)

This application claims the benefit of Korean Patent Application No. 10-2013-0158483, filed on Dec. 18, 2013 in the Korean Intellectual Property Office, the disclosure of which is incorporated herein by reference in its entirety.

BACKGROUND

1. Field

Apparatuses and methods consistent with exemplary embodiments relate to providing a display apparatus for outputting a transparent and opaque image using a transparent display.

2. Description of the Related Art

Display apparatuses serving as media terminals for delivering information to humans have shown a very rapid growth rate from initial cathode ray tube (CRT)-type monochrome display apparatuses having an extremely large volume to recent super-thin and large-area full color display apparatuses.

Display apparatuses are being developed for displaying images with more sophistication and beauty than apparatuses for displaying only simple text and images.

Transparent displays, whose development has recently accelerated, are apparatuses capable of showing items which are located behind the display by increasing transmittance of the display, and are used for showcases, information windows, and the like.

Current transparent displays of the related art are designed such that a separate internal light source is provided in order for an object to be disposed inside of a showcase or the like having a transparent display to be visible. In this case, it is possible to see through the transparent display to the internal object, but there is no uniform light source. Therefore, according to a position of the light source and a position of the object, it is difficult to see an image displayed on the display and the color reproduction of the display is decreased.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments may provide a display apparatus having a transparent mode for outputting an internal object and a related image when the internal object is seen using a transparent display.

One or more exemplary embodiments may also provide a display apparatus having an opaque mode for outputting an image having the same level as in an existing LCD display when an accurate image needs to be output on the display.

According to an aspect of an exemplary embodiment, there is provided a display apparatus including: a main body; and a display unit coupled to the main body and configured to implement at least one of a transparent mode and an opaque mode, wherein the display unit includes a transparent display panel exposed at a front surface of the main body, a first light source disposed behind the transparent display panel, a transparency adjusting unit disposed behind the first light source, and a second light source disposed behind the transparency adjusting unit.

The opaque mode may be a mode that is implemented such that an object accommodated inside the main body is not visible through the display unit from the outside.

The transparency adjusting unit may include a mesh-type structure.

The transparency adjusting unit may reflect light output from the first light source.

A first surface of the transparency adjusting unit may include a white material such that the light output from the first light source is reflected by the first surface.

The transparency adjusting unit may absorb the light output from the second light source.

A second surface of the transparency adjusting unit may include a black material such that the light output from the second light source is absorbed by the second surface.

The first light source may be disposed behind an edge of a rear surface of the transparent display panel.

The second light source may be installed inside the main body.

At least one of the first light source and the second light source may include a linear light source.

The display unit may further include a communicating unit configured to receive data from the outside and a controller configured to perform signal processing of the received data and output a driving command corresponding to the signal processing.

The controller may be further configured to output a driving command for turning the first light source off and turning the second light source on such that a transparent image is displayed on the transparent display panel according to the signal processing.

The controller may output a driving command for turning the first light source on and turning the second light source off such that an opaque image is displayed on the transparent display panel according to the signal processing.

The controller may be further configured to set a transparency of the transparent display panel to one of a high, a medium, or a low transparency according to the signal processing.

In response to a transparency of the transparent display panel being set to a high transparency according to the signal processing, the controller may be further configured to output a driving command for turning the first light source off and turning the second light source on.

In response to a transparency of the transparent display panel being set to a medium transparency according to the signal processing, the controller may be further configured to output a driving command for turning the first light source and the second light source on.

In response to a transparency of the transparent display panel being set to a low transparency according to the signal processing, the controller may be further configured to output a driving command for turning the first light source on and the second light source off. According to an aspect of another exemplary embodiment, there is provided a display apparatus including: a display panel having a variable transparency, including: a transparent display panel having a front side display surface configured to display an image and a rear side surface opposite to the front side display surface; a mesh panel disposed behind the rear side surface of the transparent display panel including: a front side surface facing the rear side surface of the transparent display and having a surface for reflecting light; and a rear side surface opposite to the front side surface and having a surface for absorbing light; a first light disposed in an area between the rear surface of the transparent panel and the front side surface of the mesh panel; a second light disposed in an area behind the rear side surface of the mesh panel; and a controller configured to vary the transparency of the display panel by controlling the first light source and the second light source.

The controller may be further configured to vary the transparency of the display panel between opaque and transparent.

When the first light is off and the second light is on, the display panel may appear transparent.

When the first light is on and the second light is off, the display panel may appear opaque.

The front side surface of the mesh panel may be white, and the rear side surface of the mesh panel may be black.

The display apparatus may further include a main body, and the display panel may be configured to form a portion of a surface of the main body.

The main body may include one of a showcase, a refrigerator, an oven, and a microwave.

BRIEF DESCRIPTION OF THE DRAWINGS

These and/or other aspects will become more apparent and more readily appreciated from the following description of certain exemplary embodiments, taken in conjunction with the accompanying drawings of which.

DETAILED DESCRIPTION OF EXEMPLARY EMBODIMENTS

Figure 1:
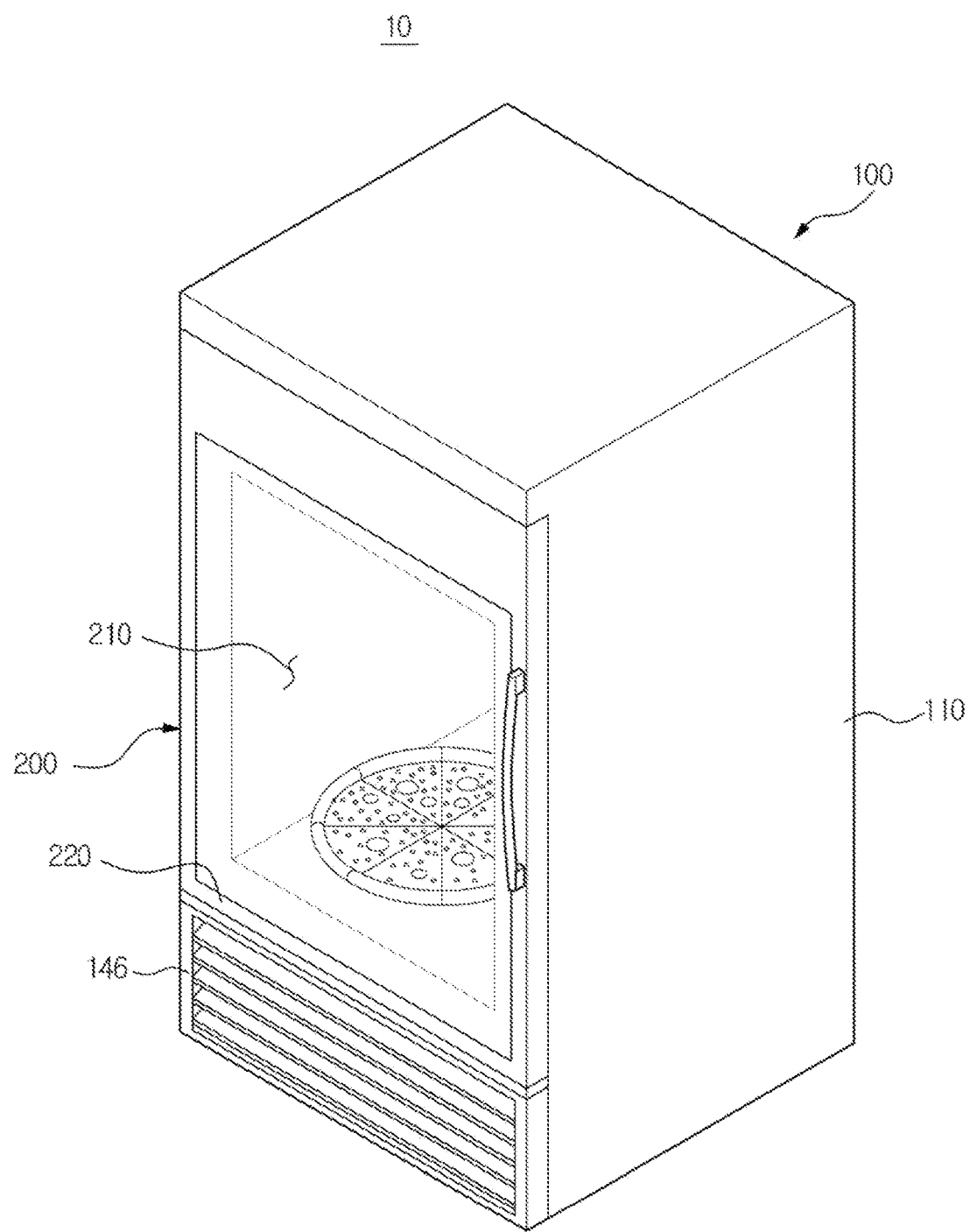
FIG. 1 is a diagram illustrating an display apparatus, according to an exemplary embodiment.

The exemplary embodiments described in this specification and illustrated in the drawings are merely exemplary and are not to be construed as limiting. Accordingly, many alternatives, modifications, and variations of the exemplary embodiments will be apparent to those skilled in the art.

A display apparatus may include a main body and a display unit that is detachably installed in a main body and that implements a transparent mode and an opaque mode. Here, the transparent mode refers to a mode that is implemented such that an object accommodated inside the main body is visible from the outside, and the opaque mode refers to a mode that is implemented such that an object accommodated inside the main body is not visible from the outside.

The main body refers to a device such as a showcase, a refrigerator, a kimchi refrigerator, or a cooking appliance such as a microwave or an oven. The display unit may be fixed in an opening or form at least one surface of the showcase, the refrigerator, the kimchi refrigerator, or the cooking appliance such as the microwave or the oven or may be used as a door of the main body.

The showcase refers to a display case for storing and displaying objects such as ornaments, food, flowers, medicine, clothes, dishes, books, artifacts, and works of art. The showcase includes a display unit which may display an image that is provided in an opening of the showcase or provided at least one surface of the showcase.

Therefore, it is possible for users to see the image and identify objects inside the showcase. Here, the display unit may be formed such that it partially or entirely forms an opening of the showcase, and may be formed such that it partially or entirely forms at least one surface of the main body.

Hereinafter, certain exemplary embodiments will be described in detail with reference to the accompanying drawings. In the following description, the same drawing reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
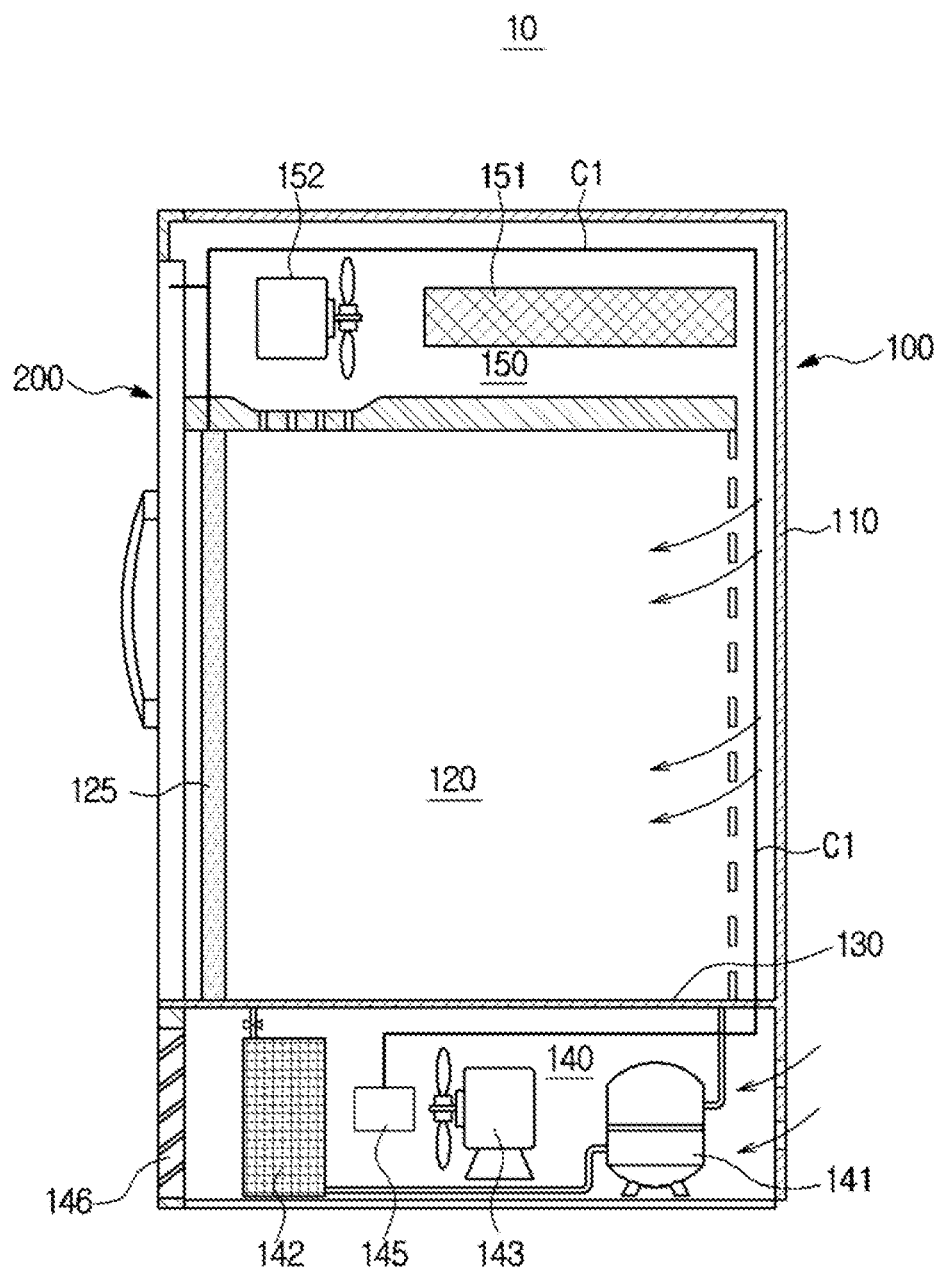
FIG. 2 is a diagram illustrating the inside of the display apparatus illustrated in FIG. 1, according to an exemplary embodiment.
Figure 3:
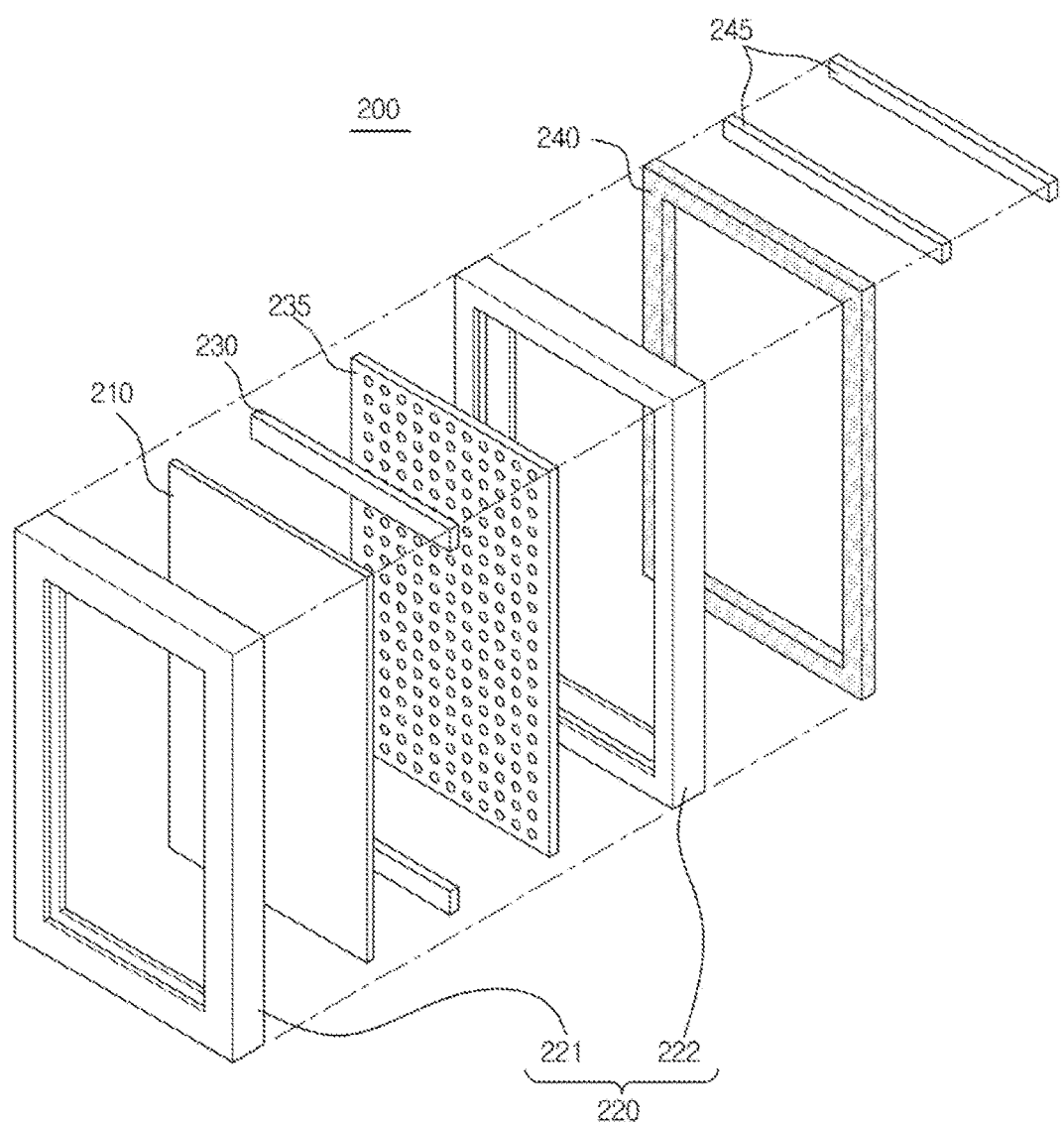
FIG. 3 is an exploded perspective view of a display unit provided in the display apparatus illustrated in FIG. 1, according to an exemplary embodiment.
Figure 4:
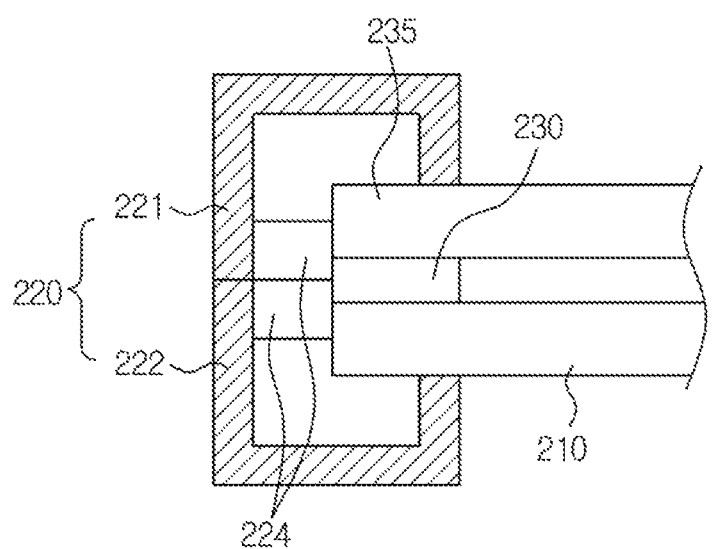
FIGS. 4 and 5 are diagrams illustrating a structure of the display unit illustrated in FIG. 3, according to an exemplary embodiment.
Figure 5:
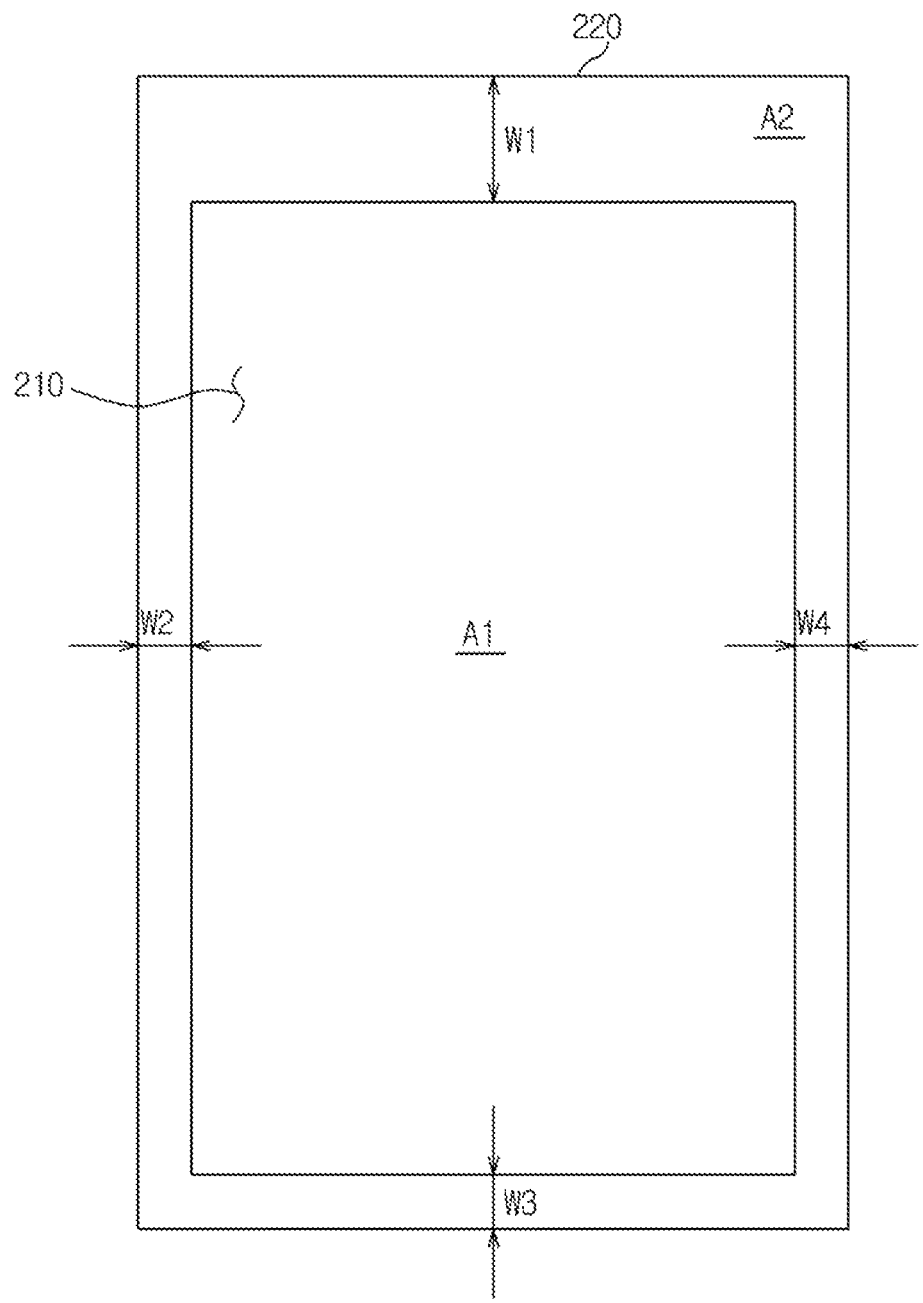

FIG. 1 is a diagram illustrating an exemplary display apparatus 10 according to an exemplary embodiment. FIG. 2 is a diagram illustrating the inside of the display apparatus 10 illustrated in FIG. 1, according to an exemplary embodiment. FIG. 3 is an exploded perspective view of a display unit 200 provided in the display apparatus 10 illustrated in FIG. 1, according to an exemplary embodiment. FIGS. 4 and 5 are diagrams illustrating a structure of the display unit 200 illustrated in FIG. 3, according to an exemplary embodiment.

For convenience of description, the display apparatus 10 including a body 100 implemented as a refrigerated showcase that maintains freshness of food and a door 200 implemented as the display unit that is installed in an opening of a main body 110 of the showcase will be described.

As illustrated in FIGS. 1 and 2, the refrigerated showcase serving as the body 100 includes the main body 110, a storage space 120, a shelf 130, a machine room 140, and a cold air creating room 150.

The main body 110 forms an appearance of the showcase. The storage space 120 for storing food or other objects is formed inside the main body 110, and an opening is formed in a front surface of the main body.

Lighting 125 for adjusting brightness in the refrigerated showcase (i.e., in the storage space 120) and the shelf 130 for stacking food are provided in the storage space 120.

The machine room 140 may be positioned below the storage space 120. The machine room 140 may include a compressor 141 configured to compress a refrigerant, a condenser 142 configured to condense the high-temperature and high-pressure refrigerant compressed by the compressor 141, a cooling fan 143 configured to cool heat generated from the compressor 141 and the condenser 142 and exchange hot air around the condenser 142, a valve (not illustrated) that is provided between the condenser 142 and an evaporator 151 and that is opened or closed based on a temperature of the storage space 120, a first power unit 145 connected to external commercial power and configured to convert the commercial power into power suitable for driving each unit and supply the converted power to each unit, and a cover 146 configured to open or close the machine room 140.

The cold air creating room 150 may be positioned above the storage space 120. The cold air creating room 150 includes the evaporator 151 configured to exchange heat of air inside the storage space 120 and a blower fan 152 configured to blow the cold air of which heat is exchanged by the evaporator 151 to the storage space 120. Here, when the valve is opened and the refrigerant is provided from the condenser 142, the evaporator 151 performs a cooling operation in which ambient latent heat is absorbed while a low-temperature liquid refrigerant is converted into a gas refrigerant. According to this operation, ambient air and air of the storage space 120 are cooled. That is, the evaporator 151 performs a function of cooling the storage space 120.

The door 200 serving as a display unit (i.e., display unit 200) is installed in an opening in the front of the main body 110 by a hinge, shields the storage space 120 from the outside, and thereby prevents cold air in the storage space 120 from leaking to the outside. That is, the door 200 opens or closes the storage space 120, and an administrator, a user, or a consumer may open and close the door 200 to load and unload food to/from the storage space 120.

As illustrated in FIGS. 3 and 4, the door 200 serving as a display unit includes a transparent display panel 210 exposed at the front of the main body 110, a first light source 230 disposed behind the transparent display panel 210, a transparency adjusting unit 235 disposed behind the first light source 230, and a second light source 245 disposed behind the transparency adjusting unit 235.

In addition, the door 200 serving as a display unit may further include the transparent display panel 210, the first light source 230, a frame 220 fixing the transparency adjusting unit 235, a hinge (not illustrated) that is provided at a top portion and a bottom portion of a side of the frame 220 and that rotatably couples a side of the door 200 to the main body 110, a packing 240 that is installed in the frame 220 on a surface contacting the front of the main body 110 and that absorbs shocks with the main body 110 when the door is closed, and a driving module 250 that is provided in a space between the frame 220 and the packing 240, and that controls driving of the transparent display panel 210, the first light source 230, and the second light source 245.

The frame 220 may include a plurality of frame members 221 and 222. The plurality of frame members 221 and 222 may be detachably coupled to each other. Out of the plurality of frame members 221 and 222, the packing 240 is detachably installed in the frame member abutting the showcase serving as the body 100.

Each of the frame members 221 and 222 includes a hole (i.e., the frame members 221 and 222 are frame shaped), and the transparent display panel 210, the first light source 230, and the transparency adjusting unit 235 are disposed in the hole. That is, the frame 220 is disposed in a perimeter of the transparent display panel 210 and thereby forms an outline of the door 200 serving as a display unit.

In the plurality of frame members 221 and 222, the transparent display panel 210, the first light source 230, and a plurality of support members 224 supporting the transparency adjusting unit 235 are provided. More specifically, the transparent display panel 210 is inserted between the frame members 221 and 222, the first light source 230 is fixed behind the transparent display panel 210, the transparency adjusting unit 235 is inserted behind the first light source 230, and the transparent display panel 210, the first light source 230, and the transparency adjusting unit 235 are fixedly installed in the frame 220 by coupling of the two frame members 221 and 222 together. In this case, the plurality of support members 224 support each side surface of the transparent display panel 210, the first light source 230, and the transparency adjusting unit 235. Here, the plurality of support members 224 also function as a coupling member coupling the two frame members 221 and 222.

As illustrated in FIG. 5, a front surface area of the door 200 serving as a display unit includes a surface area A1 of the transparent display panel 210 and a surface area A2 of the frame 220. In addition, in order to easily and safely install the driving module 250, a width W1 of the frame 220 of a side surface in which the driving module 250 is installed may be formed to be larger than widths W2, W3, and W4 of the frame 220 of the remaining side surfaces.

The transparent display panel 210 may be a display panel such as a liquid crystal display (LCD) panel or an organic light emitting diode (OLED) display panel. For convenience of description, the LCD panel will be described.

The transparent display panel 210 according to the exemplary embodiments increases transmittance of cells constituting a liquid crystal panel, and transmits light both when the liquid crystal cells of the liquid crystal panel are driven and when no liquid crystal cell of the liquid crystal panel is driven. Put another way, the liquid crystal panel maintains a transparent state regardless of the driving.

Therefore, the transparent display panel 210 maintains a transparent state regardless of a display driving command. However, the transparency of the door 200 serving as the display unit as seen from the front of the main body 110 is adjusted under control of the first light source 230 and the second light source 245. This will be described in greater detail below.

A light source may be any one of a cold cathode fluorescence lamp (CCFL) and an external electrode fluorescence lamp (EEFL), a luminescent diode array (LED array), lighting in the storage space 120, natural light, etc. Hereinafter, the light source included in the display unit will be described.

The light source may include the first light source 230 and the second light source 245. At least one first light source 230 and at least one second light source 245 may be provided.

More specifically, the first light source 230 may be installed behind the transparent display panel 210. For example, the first light source 230 may include a linear light source and may be installed on an edge of the transparent display panel 210. In order to increase uniformity of light to be output, the first light source 230 may include another linear light source symmetrically installed on the opposite edge of the transparent display panel 210. In addition, the second light source 245 may be installed behind the transparency adjusting unit 235. In order to increase uniformity of light to be output, the second light source 245 may be installed inside the showcase, and more specifically, on at least one surface among inner surfaces of the showcase in the form of a linear light source.

The first light source 230 according to the present exemplary embodiment may include a first light and a second light respectively installed on the left and right sides behind the rear surface of the transparent display panel 210 with respect to the front of the main body 110. The second light source 245 may include a third light and a fourth light respectively installed on the left and right sides behind the rear surface of the transparency adjusting unit 235 with respect to the front of the main body 110, and more specifically, may be installed on an upper surface inside the showcase and may provide a function of the lighting 125.

Figure 6:
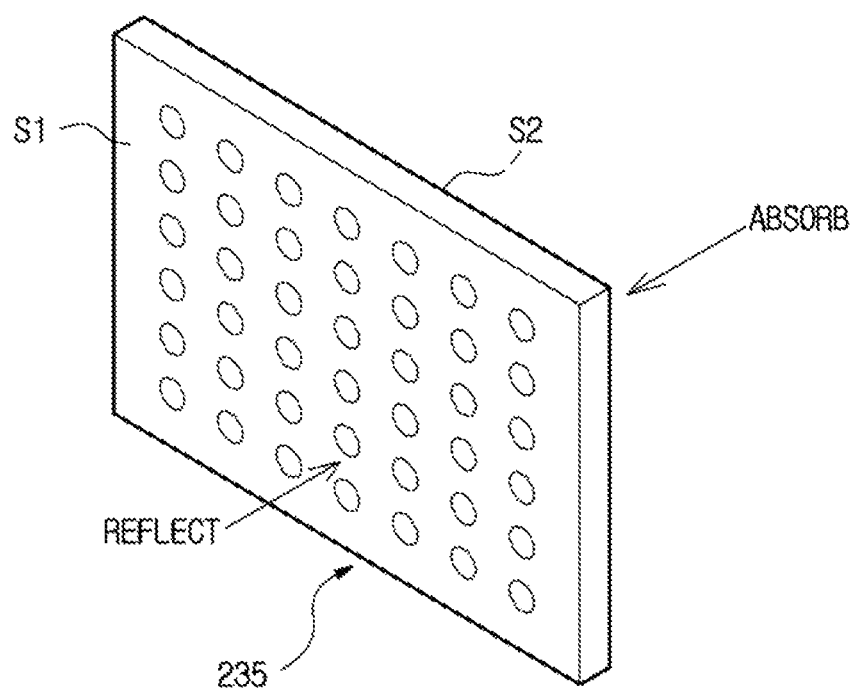
FIG. 6 is a diagram illustrating an enlarged transparency adjusting unit of the display unit illustrated in FIG. 3, according to an exemplary embodiment.

The transparency adjusting unit 235 is disposed behind the first light source 230, and allows an opaque image, that is, a more distinct image, to be displayed by the display unit 200 of the display apparatus 10 according to an exemplary embodiment. FIG. 6 is a diagram illustrating the enlarged transparency adjusting unit 235 according an exemplary embodiment. Hereinafter, the transparency adjusting unit 235 will be described in detail with reference to FIG. 6.

As illustrated in FIG. 6, the transparency adjusting unit 235 has a mesh-type structure (e.g., a net, web, knit, or woven structure or material). A mesh-type structure may refer to a structure with a large number of small, evenly spaced holes which allow light to pass though. The transparency adjusting unit 235 having a mesh-type structure includes coating layers having different properties formed on a first surface S1 and a second surface S2, respectively. Accordingly, light output from the first light source 230 and the second light source 245 is reflected or absorbed by the mesh-type structure depending on the properties of the coating layer.

More specifically, in the transparency adjusting unit 235, reflectivity of the first surface S1 facing the first light source 230 is high such that the light output from the first light source 230 is reflected by the first surface S1. For example, the first surface S1 may include a coating layer comprising white paint such that the reflectivity of the first surface S1 is high.

In contrast, the absorbance of the second surface S2 facing the second light source 245 is high such that the light output from the second light source 245 is absorbed. For example, the second surface S2 may include a coating layer comprising black paint such that the absorbance of the second surface S2 is high.

The driving module 250 includes at least one printed circuit board (PCB). The driving module 250 includes a second power unit 251 configured to convert power of the first power unit 145 into driving power for a communicating unit 252, driving power for a controller 253, and driving power for a display driving unit 254, the communicating unit 252 configured to receive data transmitted from a server, a controller 253 configured to perform signal processing on the received data and output a driving command corresponding to the signal-processed data, and a display driving unit 254 configured to display the data on the transparent display panel 210 and be driven in response to a command of the controller 253 such that transparency of the displayed data is adjusted.

The second power unit 251 is connected to the first power unit 145 of the main body 110 through a first cable C1 and is supplied with power from the first power unit 145. The first cable C1 may be included in the body 100 and the door 200. That is, the first cable C1 may extend from the body 100 to the door 200 and may connect the first power unit 145 and the second power unit 251.

Figure 7:
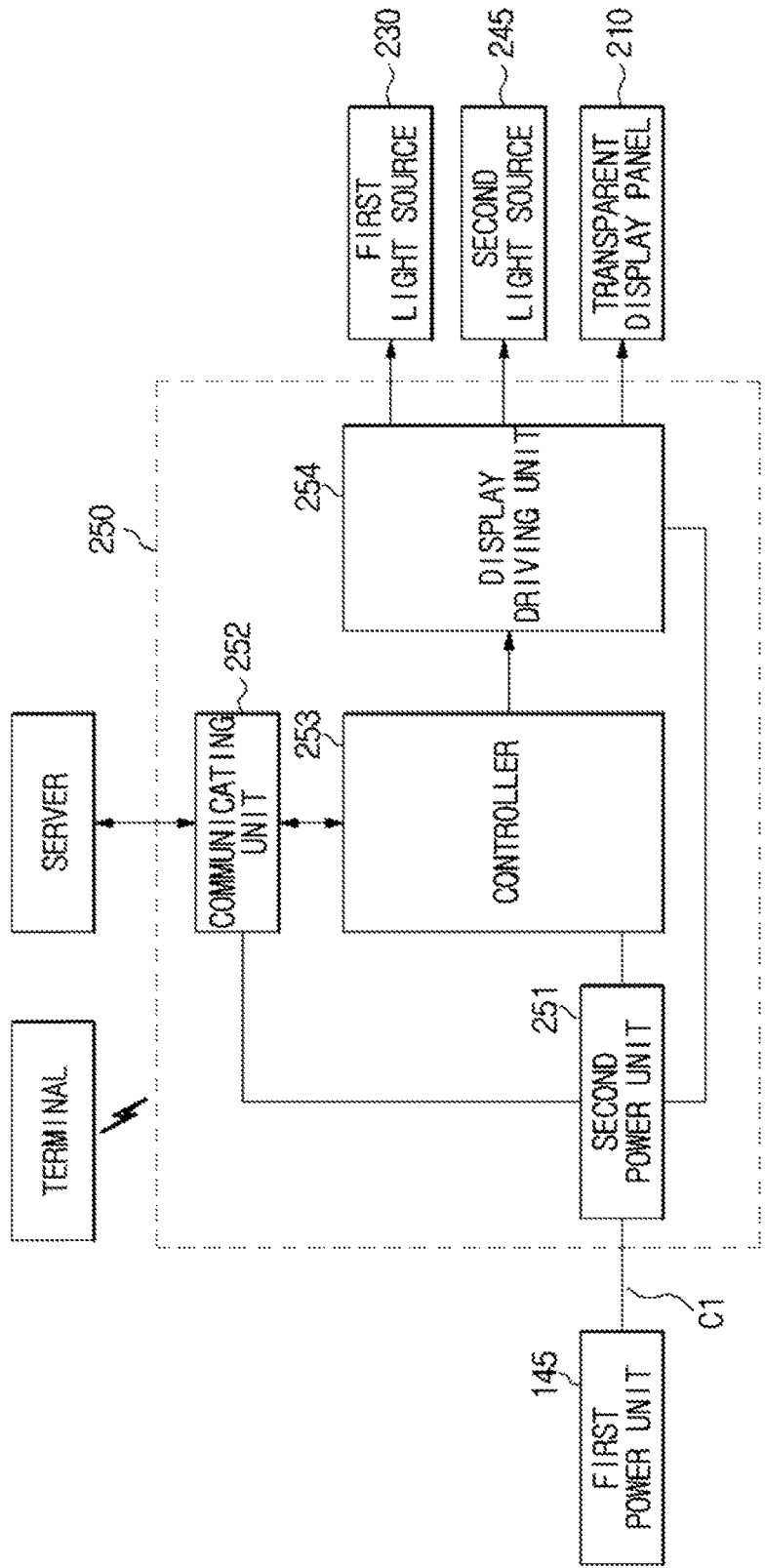
FIG. 7 is a control block diagram of a display apparatus according to an exemplary embodiment.

FIG. 7 is a diagram illustrating a control configuration of the display unit 200 provided in the display apparatus 10 according to an exemplary embodiment. The display unit 200 according to the present exemplary embodiment includes the second power unit 251, the communicating unit 252, the controller 253, and the display driving unit 254.

Any of the communicating unit 252, the input unit 260, the controller 253, and the display driving unit 254 may include at least one of a processor, a hardware module, or a circuit for performing their respective functions.

Here, the second power unit 251, the communicating unit 252, the controller 253, and the display driving unit 254 are provided in the driving module 250 which may be disposed in the frame 220 of the door 200 serving as a display unit.

The second power unit 251 is connected to the first power unit 145 of the main body 110 through the first cable C1, is supplied with power from the first power unit 145, converts the supplied power into driving power for the communicating unit 252, driving power for the controller 253, and driving power for the display driving unit 254, and supplies the converted power to the communicating unit 252, the controller 253, and the display driving unit 254. The second power unit 251 may perform AC/DC conversion and DC/DC conversion.

The communicating unit 252 receives data transmitted from any one of the server and a terminal, and transmits the received data to the controller 253. The communicating unit 252 may perform at least one of wired communication and wireless communication.

Here, examples of the data include advertising image data, food data such as a producer, an expiration date, nutrients, and country of origin for each food, event introduction image data, discount coupon image data, and guide map image data around the showcase. Such image data includes format information such as drawings, photographs, text, and videos.

In addition, the server performs at least one of wired communication and wireless communication with the communicating unit 252, and the terminal performs wireless communication such as WiFi and Bluetooth with the communicating unit 252. The terminal may also directly control driving of the transparent display panel 210 using an administrator terminal (not illustrated).

The controller 253 performs signal processing on the received data and outputs a driving command corresponding to the signal-processed data to the display driving unit 254. In this case, the controller 253 receives data in a preset format and decodes the received format.

The display driving unit 254 is driven in response to a command of the controller 253 such that data is displayed on the transparent display panel 210.

The display driving unit 254 drives the liquid crystal cells of the liquid crystal panel in response to a command of the controller 253 to thereby display an image on the transparent display panel 210, and drives the first light source 230 and the second light source 245 to thereby adjust the transparency of the image displayed on the transparent display panel 210.

Transparency adjustment of the display driving unit 254 will now be described in greater detail. The display driving unit 254 turns the first light source 230 off and turns the second light source 245 on in response to a command of the controller 253, and thereby a transparent image may be displayed by the transparent display panel 210. Also, by turning the first light source 230 on and turning the second light source 245 off, an opaque image may be displayed by the transparent display panel 210. Here, when the first light source 230 is turned on and the second light source 245 is completely turned off, it is possible to adjust transparency of the image displayed by the transparent display panel 210 to be close to 0 (i.e., not transparent).

Figure 8:
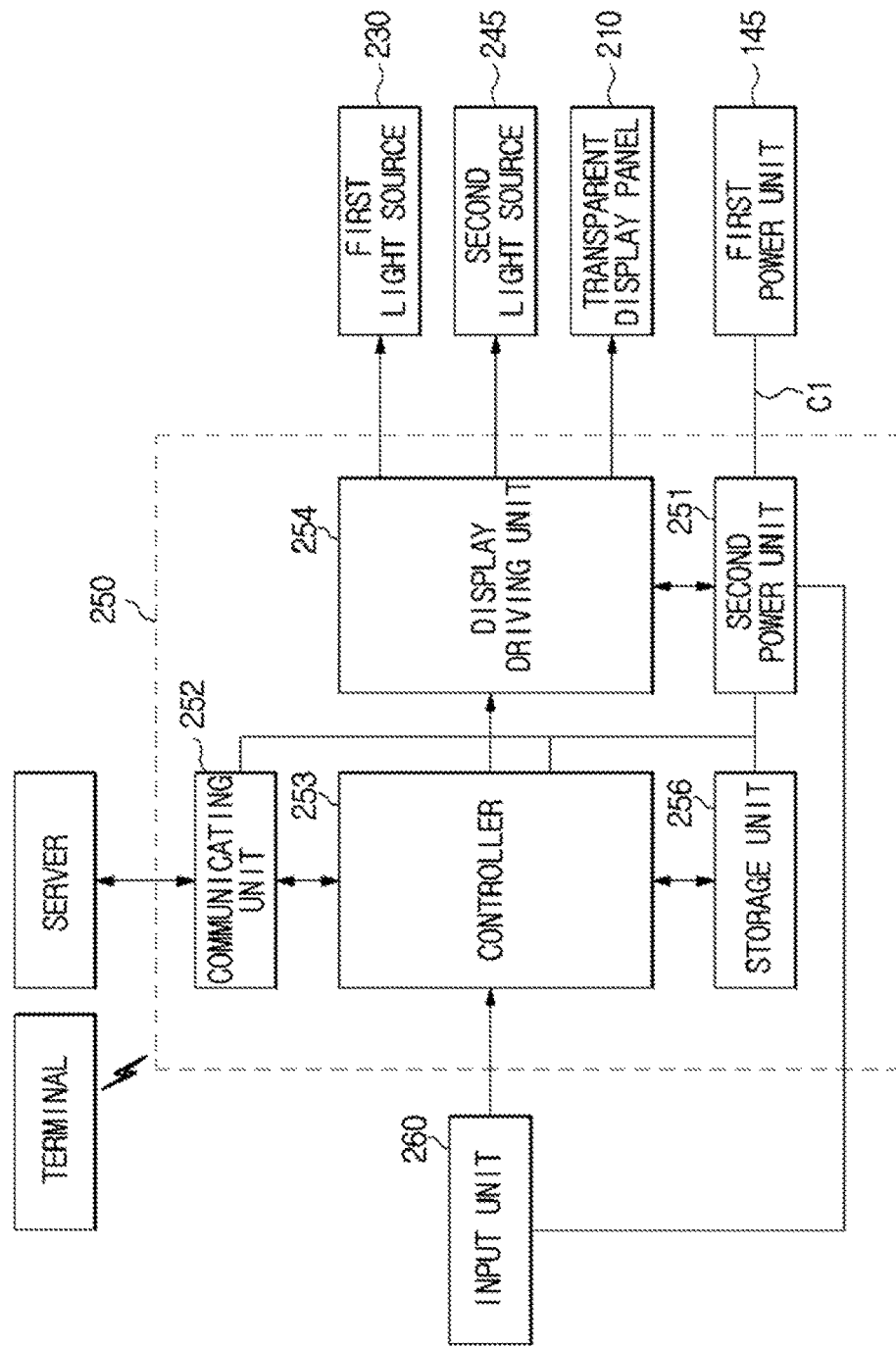
FIG. 8 is a control block diagram of a display apparatus which further includes a storage unit and an input unit according to another exemplary embodiment.

FIG. 8 is a diagram illustrating a control configuration of the display unit 200 provided in the display apparatus 10 according to another exemplary embodiment. The display apparatus 10 according to the present exemplary embodiment further includes the storage unit 256 configured to store data and an input unit 260 configured to receive data received by the communicating unit 252 or data stored in the storage unit 256 in addition to the configuration illustrated in FIG. 7. Hereinafter, for convenience of description, description identical to that of FIG. 7 will be omitted.

In terms of a configuration of the driving module 250, the second power unit 251, the communicating unit 252, the controller 253, the display driving unit 254, and the storage unit 256 may be provided in the single driving module 250. The input unit 260 may be disposed together with the driving module 250. As illustrated in FIG. 8, the input unit 260 may be disposed in the frame 220 and may be electrically connected to the controller 253 of the driving module 250.

The second power unit 251 is connected to the first power unit 145 of the main body 110 through the first cable C1, is supplied with power from the first power unit 145, converts the supplied power into driving power necessary for driving each configuration unit, and supplies the converted power to the communicating unit 252, the controller 253, the display driving unit 254, the storage unit 256, and the input unit 260. The second power unit 251 may perform AC/DC conversion and DC/DC conversion.

The controller 253 performs signal processing on the data received by the communicating unit 252 and outputs a driving command corresponding to the signal-processed data to the display driving unit 254. In this case, the controller 253 receives the data in a preset format and decodes the received format.

In addition, the controller 253 performs signal processing on data stored in the storage unit 256 and outputs a driving command corresponding to the signal-processed data to the display driving unit 254.

Figure 9:
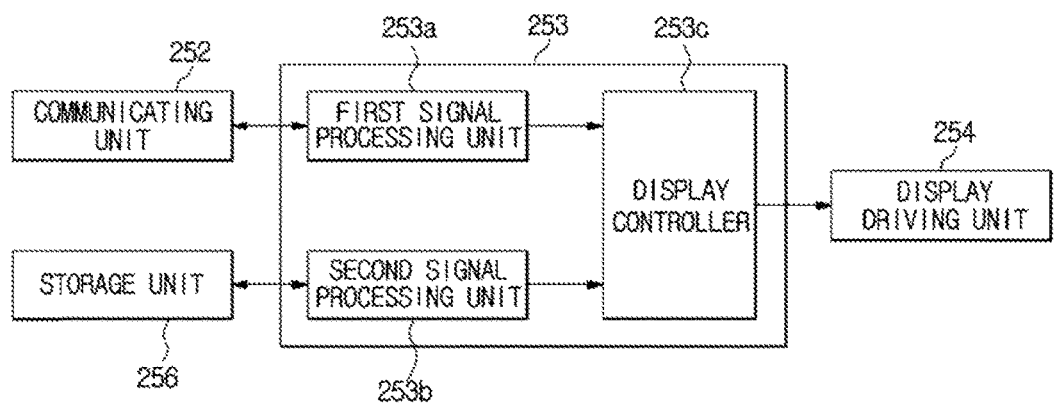
FIG. 9 is a diagram illustrating a detailed control block diagram of a controller illustrated in FIG. 8, according to an exemplary embodiment.

As illustrated in FIG. 9, the controller 253 includes a first signal processing unit 253a configured to perform signal processing on the data received by the communicating unit 252, a second signal processing unit 253b configured to perform signal processing on the data stored in the storage unit 256, and a display controller 253c configured to generate and output a driving command for displaying the data that is signal-processed in the first signal processing unit 253a and the second signal processing unit 253b.

Here, the first signal processing unit 253a may include a signal processing unit configured to perform signal processing on data received via wired communication and a signal processing unit configured to perform signal processing on data received via wireless communication. The second signal processing unit 253b may encode/decode data when the data is stored in the storage unit 256.

In addition, the controller 253 and the first and second processing units 253a, 253b may also be provided separately. In this case, the first signal processing unit 253a and the second signal processing unit 253b transmit the signal-processed data to the controller 253.

The storage unit 256 stores data transmitted from any of the server and the terminal. In this case, the data may be stored in the form of a compressed file.

The controller 253 may control driving of the display driving unit 254 based on a signal input from the input unit 260. For specific description, a control configuration between the controller 253 and the input unit 260 will be described in detail.

The input unit 260 may include a power mode button for turning power on and off, a first mode button for displaying an advertising image transmitted from the server via wired and/or wireless communication, a second mode button for displaying an image stored in the storage unit 256, and a third mode button for adjusting the transparency of the transparent display panel 210.

The input unit 260 transmits a signal of the button input by the user to the controller 253.

The controller 253 controls driving of the display driving unit 254 based on the signal of the button transmitted from the input unit 260.

More specifically, while power is supplied to the transparent display panel 210, when an input signal of the power mode button is transmitted, the controller 253 performs control such that image display of the transparent display panel 210 is terminated and thereby the transparent display panel 210 maintains a transparent state, and while power of the transparent display panel 210 is blocked, when an input signal of the power mode button is transmitted, the controller 253 controls image display of the transparent display panel 210 and thereby image information is displayed on the transparent display panel 210.

The controller 253 performs control such that an advertising image transmitted from the server via wired and/or wireless communication is displayed on the transparent display panel 210 when an input signal of the first mode button is transmitted, an image stored in the storage unit 256 is displayed on the transparent display panel 210 when an input signal of the second mode button is transmitted, and transparency of an image displayed on the transparent display panel 210 is adjusted in the range of 0 to 100 when an input signal of the third mode button is transmitted.

Here, due to characteristics of the display apparatus 10, the first mode and the second mode implemented in the transparent display panel 210 may be modes that are set to display an image having preset first transparency, and the third mode may be a mode that adjusts transparency of the image of the preset first mode and second mode.

Hereinafter, for convenience of description, a control process of the controller 253 will be described in detail by exemplifying a case in which the third mode is classified as a high mode, a medium mode, or a low mode according to transparency of an image to be displayed by the transparent display panel 210. However, the third mode should be broadly understood as a concept including a mode for continuously adjusting transparency within the scope that can be easily conceivable by those skilled in the art.

When transparency is set to high in the third mode (hereinafter referred to as a "high mode"), the controller 253 turns the first light source 230 off and turns the second light source 245 on, and thereby a transparent image is displayed on the transparent display panel 210. When transparency is set to low (hereinafter referred to as a "low mode"), the controller 253 turns the first light source 230 on and turns the second light source 245 off, and thereby an opaque image is displayed on the transparent display panel 210. When transparency is set to medium (hereinafter referred to as a "medium mode"), the controller 253 turns the first light source 230 and the second light source 245 on, and thereby an image having medium transparency is displayed on the transparent display panel 210.

Hereinafter, a principle of implementing the high mode and the low mode of the transparent display panel 210 by adjusting on and off states of the first light source 230 and the second light source 245 in the third mode will be described in detail with reference to FIGS. 10A and 10B.

Figure 10A:
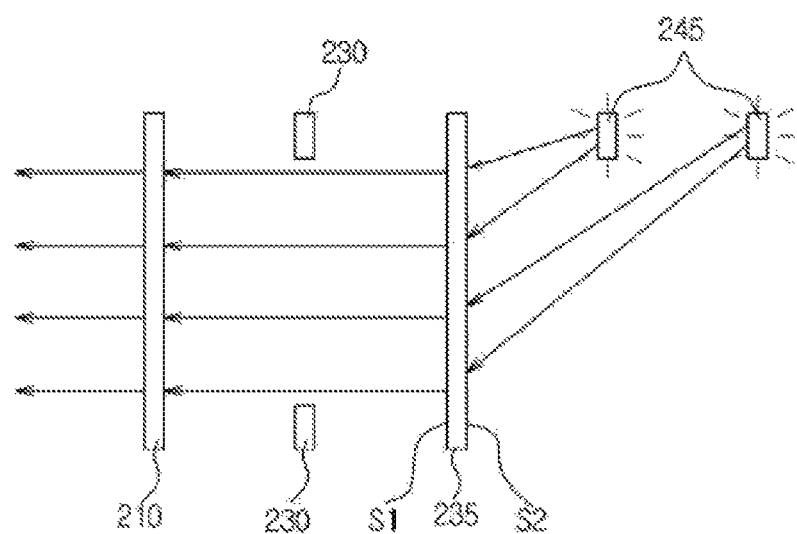
FIGS. 10A and 10B are diagrams illustrating a principle of adjusting transparency of the display apparatus, according to an exemplary embodiment.

FIG. 10A is a diagram illustrating a principle of implementing the high mode according to an exemplary embodiment.

As illustrated in FIG. 10A, the high mode refers to a mode for displaying a transparent image on the transparent display panel 210, in which the first light source 230 is turned off, the second light source 245 is turned on, the light output from the second light source 245 is applied to the transparent display panel 210, and thereby a display image is output.

In this case, the light output from the second light source 245 is delivered to the second surface S2 of the transparency adjusting unit 235, and due to characteristics of the second surface S2 of which absorbance is increased such that no (or very little) light is reflected, and the light delivered to the second surface S2 is delivered to the transparent display panel 210 while minimizing light loss. Therefore, a transparent image may be displayed by the transparent display panel 210.

Figure 10B:
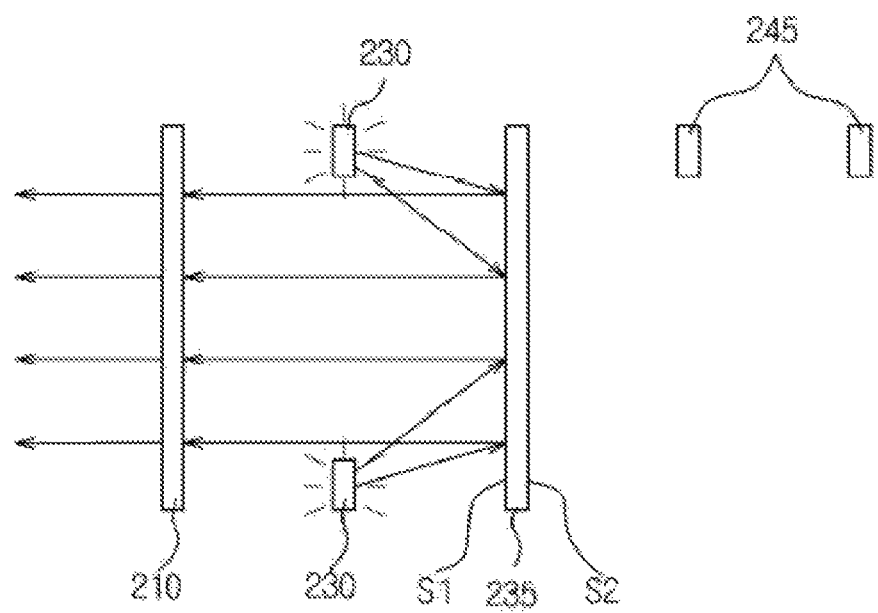

FIG. 10B is a diagram illustrating a principle of implementing the low mode according to an exemplary embodiment.

As illustrated in FIG. 10B, the low mode refers to a mode for displaying an image on the transparent display panel 210 without displaying an internal object, in which the first light source 230 is turned on, the second light source 245 is turned off, the light output from the first light source 230 is incident on the first surface S1 of the transparency adjusting unit 235 and then is reflected, and thereby a display image is output.

In this case, the light output from the first light source 230 is delivered to the first surface S1 of the transparency adjusting unit 235, and due to characteristics of the first surface S1 of which reflectivity is increased such that incident light is maximally reflected, the light delivered to the first surface S1 is reflected and delivered to the transparent display panel 210 while minimizing light loss. In this case, due to a mesh structure of the transparency adjusting unit 235, the light output from the first light source 230 is uniformly reflected and is output in a direction of the transparent display panel 210, and an image having no (or very little) color loss is output through the display.

Figure 11A:
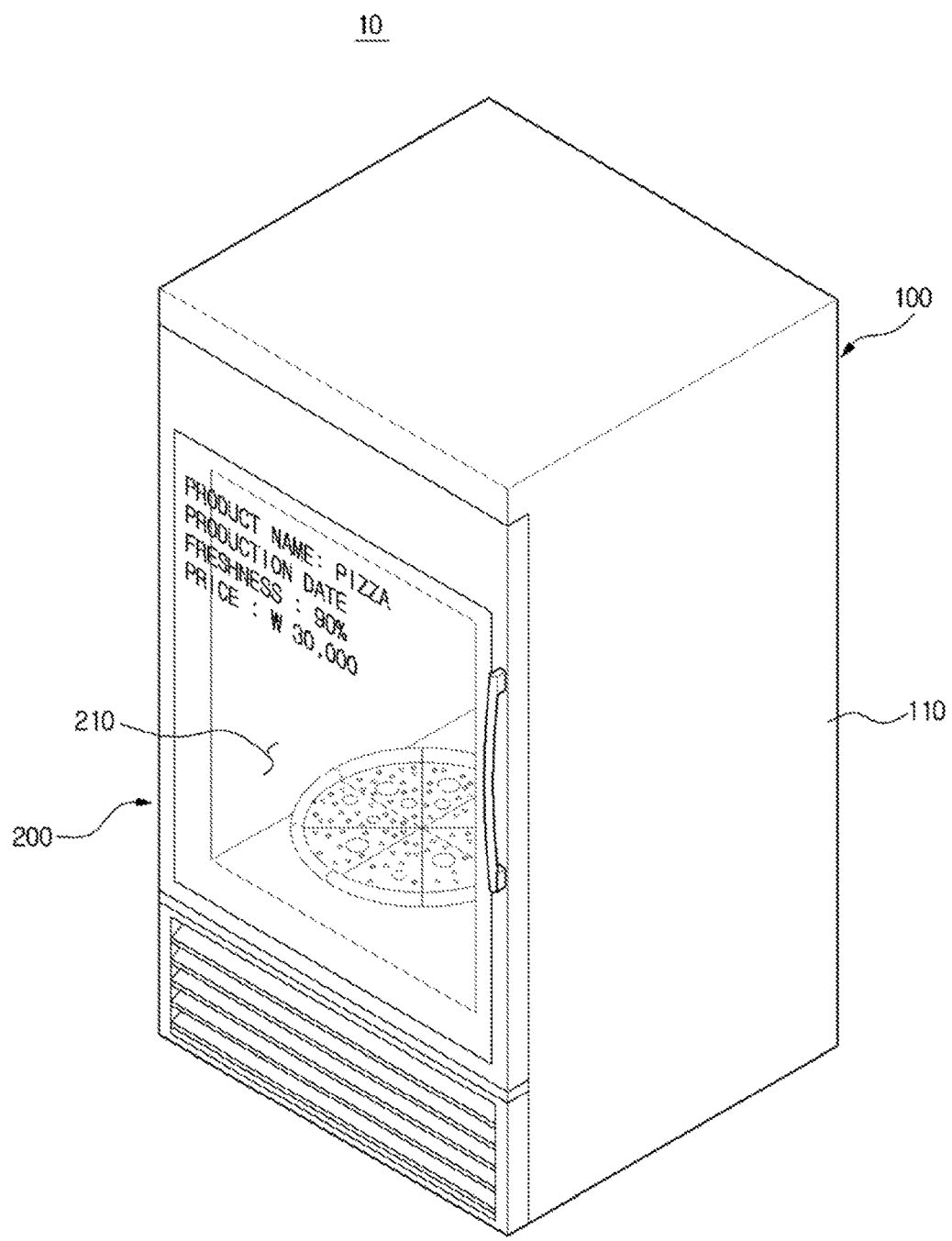
FIGS. 11A and 11B are diagrams illustrating examples of adjusting transparency of the display apparatus, according to an exemplary embodiment.
Figure 11B:
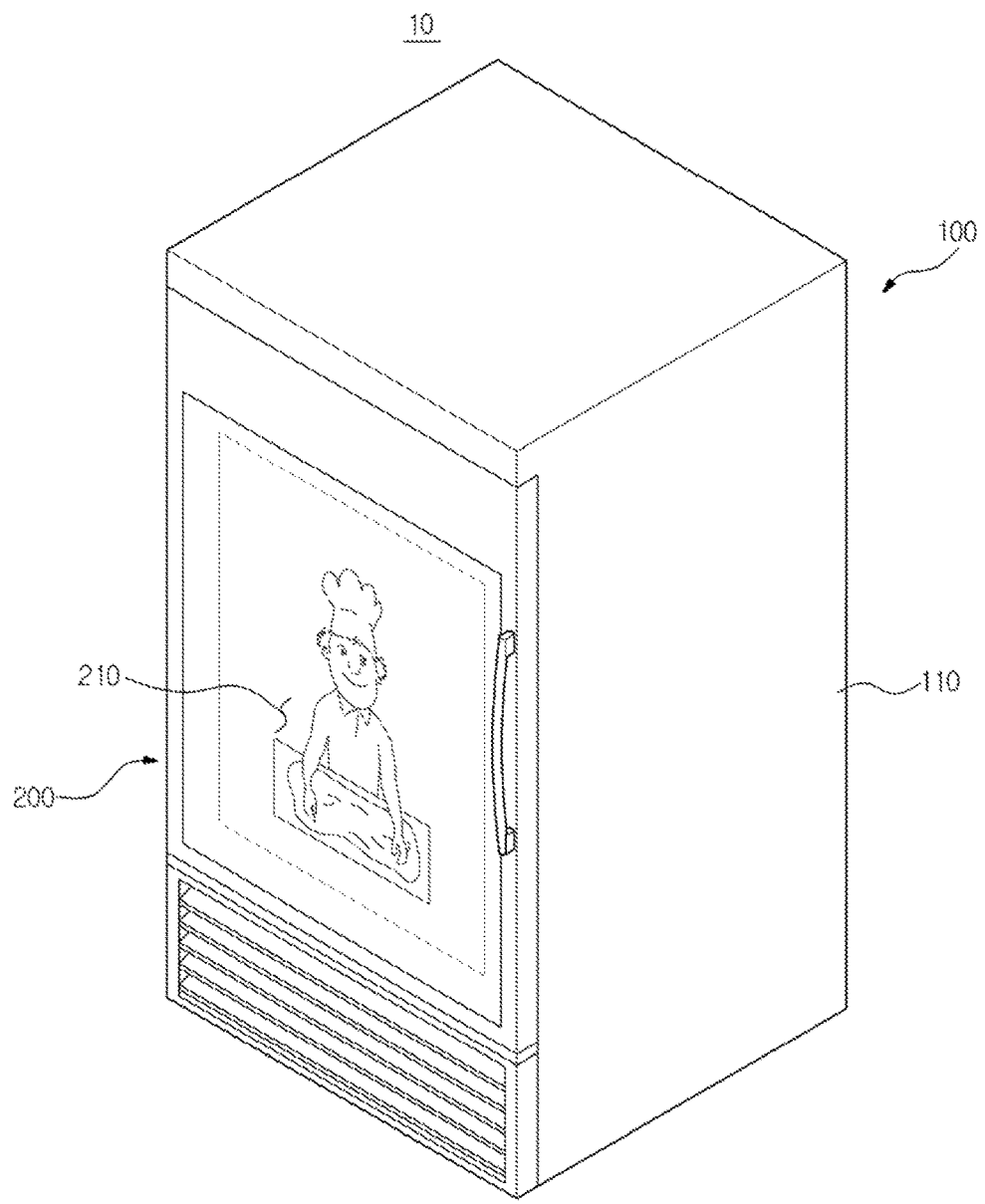

Next, FIGS. 11A and 11B are diagrams illustrating images displayed by the transparent display panel 210 when the high mode and the low mode are implemented in the third mode of the display apparatus 10 according to an exemplary embodiment.

As illustrated in FIG. 11A, when the display apparatus 10 according to an exemplary embodiment is implemented in the high mode, transparent image information is output to the transparent display panel 210. For example, when a pizza is accommodated inside the showcase and is exhibited, a production date, a production method, ingredients, freshness, and a price of the pizza, a chef's biography, and the like may be displayed on the front of the transparent display panel 210, while the pizza accommodated therein is visible through the transparent display panel 210.

As illustrated in FIG. 11B, when the display apparatus 10 according to an exemplary embodiment is implemented in the low mode, opaque image information is output to the transparent display panel 210. Following the example in FIG. 11A, when the pizza is exemplified, it is possible to display an image related to a method of producing the pizza as necessary while the display apparatus 10 is used without the pizza being visible.

In this way, when the internal object is seen through the display apparatus 10 according to exemplary embodiments, it is possible to output the internal object and the related image in the high mode, and when an accurate image needs to be output to the display apparatus 10, or when the internal object needs to be hidden, it is possible to output an image having the same (or similar) level as in an existing LCD display in the low mode.

Therefore, it is possible to provide may display options according to purposes of use of the user using the display apparatus 10 according to the exemplary embodiments.

The display apparatus according to the exemplary embodiments may have the following effects.

The display apparatus according to exemplary embodiments may provide a transparent display mode in which an object exhibited inside the display apparatus can be seen, and provides an opaque display mode when an accurate image having no color loss needs to be output. Therefore, it is possible to provide more cases according to purposes of use of the user.

Although only certain exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus, comprising:
   a main body; and
   a display unit coupled to the main body and configured to implement at least one of a transparent mode and an opaque mode,
   wherein the display unit includes a transparent display panel exposed at a front surface of the main body, a first light source disposed behind the transparent display panel, a transparency adjusting unit disposed behind the first light source, a second light source disposed behind the transparency adjusting unit, and a controller configured to vary a transparency of the transparency adjusting unit by outputting a driving command for controlling the first light source and the second light source to implement at least one of the transparent mode and the opaque mode, and
   wherein the transparency adjusting unit comprises a mesh-type structure,
   wherein a first surface of the transparency adjusting unit comprises a white material such that light output from the first light source is reflected by the first surface, and
   wherein a second surface of the transparency adjusting unit comprises a black material such that light output from the second light source is absorbed by the second surface.

2. The apparatus according to claim 1,
   wherein the opaque mode is a mode that is implemented such that an object accommodated inside the main body is not visible through the display unit from the outside.

3. The apparatus according to claim 1,
   wherein the transparency adjusting unit absorbs light output from the second light source.

4. The apparatus according to claim 1,
   wherein the first light source is disposed behind an edge of a rear surface of the transparent display panel.

5. The apparatus according to claim 1,
   wherein the second light source is installed inside the main body.

6. The apparatus according to claim 1,
wherein the display unit further includes a communicating unit configured to receive data from the outside, and
wherein the controller is further configured to perform signal processing of the received data and output the driving command corresponding to the signal processing.

7. The apparatus according to claim 6,
wherein the controller is further configured to output a driving command for turning the first light source off and turning the second light source on such that a transparent image is displayed on the transparent display panel according to the signal processing.

8. The apparatus according to claim 6,
wherein the controller outputs a driving command for turning the first light source on and turning the second light source off such that an opaque image is displayed on the transparent display panel according to the signal processing.

9. The apparatus according to claim 6,
wherein the controller is further configured to set a transparency of the transparent display panel to one of a high, a medium, or a low transparency according to the signal processing.

10. The apparatus according to claim 6,
wherein, in response to a transparency of the transparent display panel being set to a high transparency according to the signal processing, the controller is further configured to output a driving command for turning the first light source off and turning the second light source on.

11. The apparatus according to claim 6,
wherein, in response to a transparency of the transparent display panel being set to a medium transparency according to the signal processing, the controller is further configured to output a driving command for turning the first light source and the second light source on.

12. The apparatus according to claim 6,
wherein, in response to a transparency of the transparent display panel being set to low a low transparency according to the signal processing, the controller is further configured to output a driving command for turning the first light source on and the second light source off.

13. A display apparatus comprising:
a display panel having a variable transparency, comprising:
a transparent display panel having a front side display surface configured to display an image and a rear side surface opposite to the front side display surface;
a mesh panel disposed behind the rear side surface of the transparent display panel comprising:
a front side surface facing the rear side surface of the transparent display and having a surface comprising a white material for reflecting light, and
a rear side surface opposite to the front side surface and having a surface comprising a black material for absorbing light;
a first light disposed in an area between the rear surface of the transparent panel and the front side surface of the mesh panel;
a second light disposed in an area behind the rear side surface of the mesh panel; and
a controller configured to vary the transparency of the display panel by controlling the first light and the second light.

14. The display apparatus of claim 13,
wherein the controller is further configured to vary the transparency of the display panel between opaque and transparent,
wherein when the first light is off and the second light is on, the display panel appears transparent, and
wherein when the first light is on and the second light is off, the display panel appears opaque.

15. The display apparatus of claim 13, further comprising a main body,
wherein the display panel is configured to form a portion of a surface of the main body.

16. The display apparatus of claim 15, wherein the main body comprises one of a showcase, a refrigerator, an oven, and a microwave.

* * * * *